United States Patent
Bader

(10) Patent No.: US 9,249,683 B2
(45) Date of Patent: Feb. 2, 2016

(54) METHOD AND DEVICE FOR DETERMINING THE CAPACITY OF AN AIRCRAFT PUMP TO DELIVER A PREDETERMINED FUEL OUTPUT

(75) Inventor: Nicolas Alain Bader, Vaux le Penil (FR)

(73) Assignee: SNECMA, Paris (FR)

( * ) Notice: Subject to any disclaimer, the term of this patent is extended or adjusted under 35 U.S.C. 154(b) by 785 days.

(21) Appl. No.: 13/372,777

(22) Filed: Feb. 14, 2012

(65) Prior Publication Data
US 2012/0204572 A1 Aug. 16, 2012

(30) Foreign Application Priority Data
Feb. 16, 2011 (FR) ..................................... 11 51266

(51) Int. Cl.
*F02C 7/26* (2006.01)
*F01D 21/00* (2006.01)
*F02C 7/236* (2006.01)
*F04C 14/08* (2006.01)

(52) U.S. Cl.
CPC .............. *F01D 21/003* (2013.01); *F02C 7/236* (2013.01); *F04C 14/08* (2013.01); *F05D 2260/80* (2013.01); *F05D 2260/85* (2013.01)

(58) Field of Classification Search
CPC ............ F02C 9/30; F02C 9/263; F02C 7/236; F02C 7/22; F02C 7/232; F04C 14/08; F01D 21/003
USPC ............ 60/734, 779, 39.091, 803; 73/112.01, 73/112.03
See application file for complete search history.

(56) References Cited

U.S. PATENT DOCUMENTS

| | | | | |
|---|---|---|---|---|
| 2,625,047 A * | 1/1953 | Wood | ............................... | 74/7 C |
| 2,888,801 A * | 6/1959 | Dotson | ........................... | 60/790 |
| 5,111,653 A * | 5/1992 | Leeson | ............................ | 60/773 |
| 7,431,569 B2 * | 10/2008 | Griffiths | .......................... | 417/53 |
| 8,291,886 B2 * | 10/2012 | Mahoney et al. | .............. | 123/399 |
| 2001/0052338 A1* | 12/2001 | Yates | ............................. | 123/506 |
| 2007/0261384 A1* | 11/2007 | Flint et al. | .................. | 60/39.281 |
| 2010/0064657 A1 | 3/2010 | Mahoney et al. | | |
| 2014/0023525 A1 | 1/2014 | Potel et al. | | |

FOREIGN PATENT DOCUMENTS

EP 1 138 933 A2 10/2001

OTHER PUBLICATIONS

French Preliminary Search Report issued Sep. 28, 2011, in Patent Application No. FR 1151266 (FA 747255) ( with English translation of Category of Cited Documents).

* cited by examiner

*Primary Examiner* — Steven Sutherland
(74) *Attorney, Agent, or Firm* — Oblon, McClelland, Maier & Neustadt, L.L.P.

(57) ABSTRACT

The invention proposes a method for determining the capacity of an aircraft pump to deliver a predetermined fuel flow rate,
characterised in that it comprises
a step of rotating the pump at a predetermined speed;
a step of supplying at least one cylinder with the totality of the fuel coming out of the pump;
a step of determining the fuel flow rate supplying said cylinder, and
a diagnostic step which consists in determining whether the pump is able to supply a sufficient flow rate as a function of the determined value of the flow rate supplying the cylinder.
The invention also proposes a device implementing the method.

14 Claims, No Drawings

METHOD AND DEVICE FOR DETERMINING THE CAPACITY OF AN AIRCRAFT PUMP TO DELIVER A PREDETERMINED FUEL OUTPUT

TECHNICAL FIELD

The invention proposes a method for determining the capacity of an aircraft pump to deliver a predetermined fuel output.

The invention more particularly proposes a method that makes it possible to determine whether the high pressure pump is capable of supplying sufficiently the combustion chamber of a turbine engine of the aircraft to enable the restart up in flight of the turbine engine.

STATE OF THE PRIOR ART

In an aircraft turbine engine, the fuel supply circuit comprises a high pressure pump that supplies the turbine engine with fuel under a flow rate and a pressure that are sufficient to ensure various functions in the turbine engine. Among the functions in the turbine engine may be cited in particular the supply of the combustion chamber and the driving of actuators of moving components with variable geometry of the turbine engine.

The high pressure pump is driven by one of the bodies of the turbine engine, the rotation speed of the high pressure pump is thus proportional to the rotation speed of said body of the turbine engine. Also, the value of the flow rate of fuel pumped is proportional to the rotation speed of the high pressure pump.

When, in flight, the turbine engine has been stopped, it no longer propels the aircraft and it is in a state known as autorotation, in other words the rotation of the turbine engine is uniquely the consequence of the relative flow of air in the compressor and turbine blades, due to the movement of the aircraft.

This rotation speed of the turbine engine in autorotation is much lower than the rotation speed of the turbine engine when it is in operation. For example, the speed of autorotation of the turbine engine is around 6% of the rotation speed at take off of the turbine engine.

The high pressure pump consequently supplies a limited fuel flow rate and pressure, which must however be sufficient to ensure a supply of the injectors making it possible to restart the turbine engine.

The high pressure pump is originally designed to supply a flow rate and a pressure making it possible to restart the turbine engine in such conditions.

However, the wear of the high pressure pump implies a reduction in the flow rate as it is used. Consequently, at a certain degree of wear, the high pressure pump becomes unsuitable to making it possible to perform the restart up in flight of the turbine engine, it is then necessary to replace it.

To ensure that the turbine engine is still equipped with a high pressure pump in good working order, it has been proposed to replace systematically the high pressure pump, or instead to perform a maintenance operation on the high pressure pump, after a given operating time period, for example 12000 hours.

However, such a solution does not make it possible to detect premature wear of the high pressure pump, and it implies the scrapping of pumps which are still in working order or instead maintenance costs on pumps not requiring these maintenance operations.

The document FR-2.923.871 describes a method of surveillance of the high pressure pump consisting in detecting at which rotation speed of the turbine engine the high pressure pump supplies a sufficient pressure to open a pressurisation valve.

The rotation speed of the turbine engine thereby measured is then compared to a predetermined speed to indicate whether the high pressure pump is still in working order or not.

According to this document, the diagnostic is performed from the pressure of the fuel at the output of the high pressure pump, there is no measurement regarding the fuel flow rate but an evaluation of said flow rate by extrapolation.

It is possible that the calculated flow rate of the high pressure pump is below the real flow rate at the output of the high pressure pump, due to leaks of fuel in the high pressure circuit, the amplitude of which has not been correctly evaluated.

It is also possible that the extrapolation is performed for the most unfavourable conditions and thus that the deterioration of the pump is overestimated.

The aim of the invention is to propose a method for determining the capacity of restart up in flight of a high pressure pump of a turbine engine from the fuel flow rate supplied by the high pressure pump.

DESCRIPTION OF THE INVENTION

The invention proposes a method for determining the capacity of an aircraft pump to deliver a predetermined fuel flow rate, in which the pump is able to supply a combustion chamber of a turbine engine of the aircraft and a fuel distribution circuit to a plurality of cylinders for actuating moving components of the turbine engine, and in which said predetermined flow rate is a fuel flow rate supplying the combustion chamber making it possible to perform a restart up of the turbine engine after stoppage while the aircraft is in flight, characterised in that it comprises:
 a step of rotating the pump at a predetermined speed;
 a supply step consisting in supplying at least one of said cylinders with the totality of the fuel coming out of the pump;
 a step of determining the fuel flow rate supplying said at least one cylinder, and
 a diagnostic step which consists in determining that the pump is able to supply a sufficient flow rate as a function of the determined value of the flow rate supplying said at least one cylinder.

The diagnostic established from the fuel flow rate supplying the cylinder makes it possible to determine directly the flow rate that can supply the combustion chamber, there is thus a low risk of error and thus a better diagnostic of the pump.

Preferably, the step of determining the fuel flow rate comprises a phase of measuring the displacement speed of said at least one cylinder and a phase of calculating the flow rate as a function of the displacement speed and as a function of the dimensions of said at least one cylinder.

Preferably, the diagnostic step consists in determining whether the pump is able to supply a sufficient flow rate if the determined value of the flow rate supplying said at least one cylinder is at least equal to the predetermined flow rate value.

Preferably, the step of rotating the pump consists in turning the pump at a rotation speed substantially equal to a rotation speed of the pump when the turbine engine is in autorotation.

Preferably, the step of rotating is implemented by an electric starter of the turbine engine.

Preferably, the supply step consists in supplying a single cylinder.

Preferably, the step of rotating the pump consists in turning the pump at a rotation speed greater than a rotation speed of the pump when the turbine engine is in autorotation.

Preferably, the step of rotating is implemented by an electric starter of the turbine engine.

Preferably, the supply step consists in supplying several cylinders.

Preferably, the method is implemented when the aircraft is stopped and is on the ground and the step of determining the flow rate comprises a phase of correction of the determined value of the flow rate supplying said at least one cylinder as a function of the ambient pressure and temperature conditions on the ground and the pressure and temperature conditions at altitude.

The invention also proposes a device implementing a method as defined previously for determining the capacity of an aircraft pump to deliver a predetermined fuel flow rate, characterised in that it comprises:

means of driving the pump up to a predetermined speed;
means of distributing the fluid at the output of the pump to at least one cylinder of the turbine engine;
means of calculating the fuel flow rate supplying said at least one cylinder; and
diagnostic means that determine whether the pump is able to deliver a predetermined fuel flow rate as a function of the fuel flow rate supplying said at least one cylinder.

Preferably, said means of calculating the fuel flow rate supplying the cylinder comprise means of measuring the displacement speed of the cylinder and means of measuring the position of said at least one cylinder.

Preferably, the drive means of the pump consist in an electric starter of the turbine engine.

Preferably, the drive means of the pump comprise means of regulating the drive speed of the electric starter.

Preferably, the drive means of the pump consist in a pneumatic starter of the turbine engine.

DETAILED DESCRIPTION OF PARTICULAR EMBODIMENTS

In an aircraft turbine engine, such as an airplane turboprop engine, the fuel is used during its combustion to supply the motor energy of the turbine engine. The fuel is also used to ensure other functions such as for example the lubrication or the actuation of power units or cylinders of the turbine engine.

The supply of the turbine engine with fuel, to ensure all of these functions, is achieved by a high pressure pump which is itself force fed with fuel by a low pressure pump.

The high pressure pump is driven in rotation by the turbine engine, so that the rotation speed of the high pressure pump is proportional to the rotation speed of the turbine engine.

Also, the high pressure pump is made so that the pressure and the fuel flow rate at the output of the high pressure pump are proportional to the rotation speed of the high pressure pump, in other words proportional to the rotation speed of the turbine engine.

Thus, the higher the rotation speed of the turbine engine, the higher the flow rate and the pressure of the fuel coming out of the high pressure pump.

The characteristics of the high pressure pump are determined so that the high pressure pump is capable of supplying with fuel all the parts of the turbine engine, whatever the operating conditions of the turbine engine.

In particular, the high pressure pump is designed to ensure a function of restart up in flight, in other words that it is capable of producing a sufficiently important fuel flow rate to supply the combustion chamber when the turbine engine has been stopped, to enable the restart up of the turbine engine.

This restart up in flight of the turbine engine takes place when it is in autorotation, in other words that the turbine engine turns under the relative action of the wind produced by the movement of the aircraft.

Generally speaking, the rotation speed of the turbine engine is around 6% of the maximum rotation speed of the turbine engine at take off of the aircraft The rotation speed of the turbine engine being reduced, the rotation speed of the high pressure pump, and consequently the fuel flow rate and pressure at the output, are also reduced.

It is thus necessary that the high pressure pump is capable of supplying a sufficiently high flow rate and pressure, under conditions of autorotation of the turbine engine, to enable restart up in flight.

Furthermore, the high pressure pump wears progressively as it is used, which leads to a progressive reduction in the fuel pressure and flow rate, for each rotation speed.

A method for diagnosing the restart up capacity of the high pressure pump has the aim of determining whether the high pressure pump is able or not to supply a sufficiently high fuel flow rate and pressure to enable the restart up in flight when the turbine engine has been stopped and is in autorotation.

This method is implemented on the ground, so that the diagnostic is carried out before the take off of the aircraft and so that the pump is replaced before the take off.

A first step of the method consists in rotating the high pressure pump up to a predetermined speed, at which rotation speed the fuel flow rate will be determined.

According to the invention, this step of the method is achieved by driving the high pressure pump by the starter of the turbine engine.

The starter of the turbine engine is either a pneumatic starter, or an electric starter.

In the case of a pneumatic starter, the speed at which the high pressure pump is driven is defined by the pressure of the compressed air that is available, as well as the characteristics of the starter.

Thus, the rotation speed of the high pressure pump is predefined and is different to the rotation speed of the high pressure pump when the turbine engine is in autorotation.

Generally, this rotation speed of the high pressure pump is greater than the rotation speed when the turbine engine is in autorotation.

In the case of an electric starter, it is possible to command the starter to turn the high pressure pump at the desired rotation speed, particularly the rotation speed corresponding to the rotation of the turbine engine in autorotation.

A second step of the method consists in maintaining the rotation speed of the high pressure pump at the predefined rotation speed and supplying one or more cylinders of the turbine engine with the totality of the fuel available at the output of the high pressure pump.

For this second step, the valve of the fuel injection circuit in the combustion chamber is shut, so that no fuel is injected. This makes is possible to ensure that all of the fuel coming out of the high pressure pump supplies said cylinder(s) of the turbine engine and that this measured quantity of fuel corresponds to the quantity of fuel that can be injected into the combustion chamber during a restart up phase in flight.

Each cylinder of the turbine engine may be supplied independently of the other cylinders by a distribution system.

Also, each cylinder is associated with sensors for the measurement and the control of the position and/or the displacement speed of the cylinder and the dimensions of the chamber of each cylinder are known. Thus, it is possible to determine the internal volume of the chamber of each cylinder as a function of its travel.

A third step of the method consists in determining the fuel flow rate supplying the cylinder or the cylinders.

A first phase of the step of determining the flow rate consists in measuring the displacement speed of the cylinder, or cylinders, which the high pressure pump supplies. This measurement of the displacement speed of the cylinder is performed by means of sensors of the position of the rod of the cylinder.

Then, a second phase consists in calculating the fuel flow rate supplying the cylinder from the displacement speed of the cylinder and as a function of the dimensions of the cylinder, particularly as a function of the interior volume of the chamber of the cylinder, which is determined as a function of the position of the rod of the cylinder.

This fuel flow rate supplying the cylinder(s) corresponds to the fuel flow rate that can supply the combustion chamber because the leaks of fuel downstream of the high pressure pump are taken into account.

As has been said previously, the method according to the invention is implemented on the ground. The pressure and temperature conditions are thus different from the conditions in flight.

Thus, a third phase of the step of determining the fuel flow rate supplying the cylinder consists in determining the flow rate that can supply the combustion chamber in restart up phase by a numerical calculation from climatic conditions on the ground and climatic conditions in flight. Preferably, said climatic conditions in flight are those that can be the most unfavourable.

In the case for which the turbine engine comprises a starter of the pneumatic type, the rotation speed of the high pressure pump during the method is greater than the rotation speed during the restart up phase.

Thus, the flow rate supplying the cylinders is greater than the flow rate during the restart up phase.

To this end, in the case for which the rotation speed of the high pressure pump is greater than the rotation speed in the restart up phase, the step of determining the fuel flow rate supplying the cylinder consists in calculating the flow rate that can supply the combustion chamber in restart up phase while taking into account the difference in rotation speeds.

In the case for which the turbine engine comprises an electric starter, the rotation speed of the high pressure pump during the method is the rotation speed of the high pressure pump during the restart up phase.

Thus, the flow rate that can supply the combustion chamber in restart up phase is the flow rate obtained at the end of the correction.

The method also comprises a diagnostic step which consists in determining whether the high pressure pump is able to supply a sufficient flow rate to perform a restart up in flight of the turbine engine by comparing the value of the fuel flow rate supplying the cylinder, which is obtained at the end of the fourth step at a threshold value of the fuel flow rate.

This threshold value of the fuel flow rate is the minimum value for which it is considered that the combustion chamber is sufficiently supplied with fuel for the restart up in flight of the turbine engine.

If the flow rate value obtained at the end of the fourth step is below the threshold value, this signifies that the high pressure pump does not have sufficient fuel supply capacity for the restart up in flight, an alert is thus emitted so that it is replaced.

On the other hand, if the flow rate value obtained at the end of the fourth step is greater than or equal to the threshold value, this signifies that the high pressure pump is capable of supplying sufficiently fuel for the restart up in flight, the high pressure pump is still in working order, it will thus not be replaced and the aircraft can fly in complete safety from the point of view of the capacity of the high pressure pump.

Such a method is implemented by a device comprising means of driving the high pressure pump up to the predetermined speed.

As has been said previously, in a first case, these drive means consist in an electric starter of the turbine engine. The rotation speed of the high pressure pump during the method is then the rotation speed of the high pressure pump during the restart up phase.

Means of commanding the starter are provided to regulate its rotation speed in order to obtain the desired rotation speed of the high pressure pump.

In a second case, the drive means consist in a pneumatic starter of the turbine engine. The speed at which the high pressure pump is driven is defined by the pressure of the compressed air that is available, as well as the characteristics of the starter, and is different from the rotation speed of the high pressure pump when the turbine engine is in autorotation.

The device implementing the method also comprises means of distributing the fluid at the output of the pump so that all of the fuel flow rate at the output of the high pressure pump is directed uniquely to at least one cylinder of the turbine engine.

The device implementing the method also comprises means of calculating the fuel flow rate supplying said at least one cylinder.

The means of calculating the fuel flow rate supplying the cylinder comprise in particular sensors or any other means of measuring the displacement speed of the cylinder and measuring the position of said at least one cylinder.

The device implementing the method also comprises diagnostic means that determine whether the pump is able to deliver a predetermined fuel flow rate as a function of the fuel output supplying said at least one cylinder.

As has been said previously, the method according to the invention is implemented on the ground. The pressure and temperature conditions are thus different to the conditions in flight.

The device according to the method comprises to this end sensors of the ambient pressure and temperature and numerical means of calculation to correct the flow rate values calculated previously, as a function of the climatic conditions on the ground and in flight.

The invention claimed is:

1. A method for determining the capacity of an aircraft pump to deliver a predetermined fuel flow rate,
   in which the pump is able to supply fuel to a combustion chamber of a turbine engine of the aircraft and a fuel distribution circuit to a plurality of cylinders for actuating moving components of the turbine engine,
   and in which said predetermined flow rate is a fuel flow rate supplying the combustion chamber making it possible to perform a restart up of the turbine engine after stoppage while the aircraft is in flight,
   comprising:
   a step of rotating the pump at a predetermined rotation speed;

a supply step including maintaining the rotation speed of the pump at the predetermined rotation speed and supplying at least one of said cylinders with the totality of the fuel coming out of the pump;

a step of determining the fuel flow rate supplying said at least one cylinder, and a diagnostic step which consists of determining whether the pump is able to supply a sufficient flow rate when the determined value of the flow rate supplying said at least one cylinder is at least equal to the predetermined flow rate value.

2. The method according to claim 1, wherein the step of determining the fuel flow rate comprises a phase of measuring the displacement speed of said at least one cylinder and a phase of calculating the flow rate as a function of the displacement speed and as a function of the dimensions of said at least one cylinder.

3. The method according to claim 1, wherein the step of rotating the pump consists of turning the pump at a rotation speed substantially equal to a rotation speed of the pump when the turbine engine is in autorotation.

4. The method according to claim 3, wherein the step of rotating is implemented by an electric starter of the turbine engine.

5. The method according to claim 3 or 4, wherein the supply step consists of supplying a single cylinder.

6. The method according to claim 1, wherein the step of rotating the pump consists of turning the pump at a rotation speed greater than a rotation speed of the pump when the turbine engine is in autorotation.

7. The method according to claim 6, wherein the step of rotating is implemented by an electric starter of the turbine engine.

8. The method according to claim 6, wherein the supply step consists of supplying several cylinders.

9. The method according to claim 1, wherein it is implemented while the aircraft is stopped and is on the ground and in that the step of determining the flow rate comprises a phase of correction of the determined value of the flow rate supplying said at least one cylinder as a function of the ambient pressure and temperature conditions on the ground and the pressure and temperature conditions at altitude.

10. A device implementing a method for determining the capacity of an aircraft pump to deliver a predetermined fuel flow rate, according to claim 1, comprising:

means of driving the pump up to a predetermined speed;

means of distributing the fluid at the output of the pump to at least one cylinder of the turbine engine;

means of calculating the fuel flow rate supplying said at least one cylinder; and diagnostic means that determine whether the pump is able to deliver a predetermined fuel flow rate as a function of the fuel flow rate supplying said at least one cylinder.

11. The device according to claim 10, wherein said means of calculating the fuel flow rate supplying the cylinder comprise means of measuring the displacement speed of the cylinder and means of measuring the position of said at least one cylinder.

12. The device according to claim 10, wherein the drive means of the pump comprise an electric starter of the turbine engine.

13. The device according to claim 12, wherein the drive means of the pump comprise means of regulating the drive speed of the electric starter.

14. The device according to claim 10, wherein the drive means of the pump consist of a pneumatic starter of the turbine engine.

* * * * *